United States Patent [19]
Wilson et al.

[11] Patent Number: 5,597,586
[45] Date of Patent: Jan. 28, 1997

[54] UNDERWATER PELLETIZER DIE SYSTEM FOR FORMING MULTISIZE THERMOPLASTIC PELLETS

[75] Inventors: Phillip S. Wilson, Dover; Marie J. Hersman, Durham, both of N.H.

[73] Assignee: Davidson Textron, Inc., Dover, N.H.

[21] Appl. No.: 496,300

[22] Filed: Jun. 28, 1995

[51] Int. Cl.$^6$ .................. B29C 47/12; B29B 9/00
[52] U.S. Cl. ................. 425/67; 264/142; 425/313; 425/464
[58] Field of Search .............. 425/67, 313, 311, 425/464; 264/142

[56] References Cited

U.S. PATENT DOCUMENTS

| | | | |
|---|---|---|---|
| 2,766,479 | 10/1956 | Henning | 118/125 |
| 2,968,834 | 1/1961 | Groombridge et al. | 425/464 |
| 3,129,458 | 4/1964 | Mitchell | 425/464 |
| 3,349,433 | 10/1967 | Schippers et al. | 425/313 |
| 3,387,327 | 6/1968 | Privott, Jr. et al. | 425/131.5 |
| 3,797,982 | 3/1974 | Borrello | 425/198 |
| 4,451,414 | 5/1984 | Rossiter | 425/311 |
| 4,621,996 | 11/1986 | Hundley, III | 425/464 |
| 4,728,276 | 3/1988 | Pauley et al. | 425/67 |
| 4,934,916 | 1/1990 | Lambertus | 425/67 |

FOREIGN PATENT DOCUMENTS 1-128810  5/1989  Japan.

*Primary Examiner*—Robert Davis
*Attorney, Agent, or Firm*—Reising, Ethington, Barnard and Perry

[57] ABSTRACT

An underwater thermoplastic pelletizer has an extruding die, and a cutter for cutting a thermoplastic polymer extruded from the die into pellets as the molten polymer is solidified under water that is circulated to cool the extruded polymer and convey the pellets away for collection. The extruding die includes a die plate that is mounted in the face of the die concentric with and opposite the cutter and has a plurality of groups of extruding die holes that are connected in the die to a central main feed passage by separate radially extending distribution feed passages. The die holes in the groups are arranged in circular patterns of uniform radius about a center line intersecting with a circle concentric with the cutter path and the groups are equally angularly spaced about the cutter center line. The die holes in each group may have a uniform size different from that in one or more of the other groups or the die holes in each group may be different in size wherein the groups of holes are all alike with multisize holes.

8 Claims, 2 Drawing Sheets

UNDERWATER PELLETIZER DIE SYSTEM FOR FORMING MULTISIZE THERMOPLASTIC PELLETS

TECHNICAL FIELD

This invention relates to underwater pelletizer die systems and more particularly to underwater thermoplastic pelletizer die systems for forming thermoplastic pellets in a wide particle size distribution.

BACKGROUND OF THE INVENTION

It is common practice in the manufacture of thermoplastic automotive interior trim panels to form the cover or skin for the panel by casting very small particles of a selected thermoplastic polymer in a wet or dry casting process against a heated shell mold whose molding surface is typically formed with a grained texture. The tool has a thin nickel coating which imparts a desired grained texture on the appearance surface of the molded panel. These small thermoplastic particles are commonly formed with an underwater pelletizer die system wherein molten polymer of the desired type is extruded through a plurality of extruding holes of uniform size in an extruding die, is cooled under water and thereby solidified by circulated cooling water. As it exits the extruding holes, the thermoplastic is cut into small particles which are carried off with the water for collection. The small thermoplastic particles thus produced are commonly called Minibeads™ pellets and are not perfectly round spheres nor do they necessarily have an extruded diameter exactly equal to the die hole size. The three dimensional size of the pellets is controlled by the size of the die hole, the speed of the cutter relative to the rate of polymer extrusion, and the die swell of the polymer. The pellets are commonly described as having a certain single dimensional size which is their maximum cross section dimension and which is the pellet dimension referred to herein.

For making thermoplastic pellets for the casting of an automotive interior trim article, the extruding die in such a pelletizer is normally provided with a very large number of extruding holes (e.g. 240) that are all of the same size; i.e. produce pellets of a narrow distribution. For example, the polymer pellets that are currently commercially available for molding automotive interior trim panels in a casting process are produced in this manner and with different extruding dies down to a size of 0.020 inches. The 0.020 inch pellets have been found to cast well and produce excellent results provided there are no tight returns or corners or very fine surface details in the article being molded. Where there are tight returns and/or corners and/or very fine surface details which is often the case in automotive interior trim panels, the minibeads may not seat in these areas on the mold surface resulting in porosity, unacceptable cavities or pits in the appearance surface of the molded panel at these locations.

This problem can be avoided by making all the pellets of a suitable smaller uniform size that will seat in the most difficult areas on the mold surface. For example, extruding die holes as small as 0.008 inches may be readily formed in an extruding die using laser machining. It has been found that pellets about this size will seat with excellent results on a mold surface having the tightest returns, corners and surface features normally encountered in an automotive trim panel. But this much smaller size pellet significantly slows the rate of production of the pellets, requiring a much greater number of pellets for a particular cast part, and consequently significantly increases the cost to produce the cast part. For example, the production output of pellets is decreased by a factor of 8 by weight in an underwater pelletizer when the pellet or bead size is halved and the same number of extruding holes is used in the extruding die. And even by doubling the number of extruding holes in the die, the pellet production is still reduced by a factor of 4 by weight as compared with pellets twice the size produced with half the number of extruding holes.

SUMMARY OF THE INVENTION

In arriving at the present invention, it was found that a mixture of small and large pellets (e.g. 0.005 and 0.020 inch pellets) in the proper proportion can yield excellent results in the casting of tight, sharp returns of an automotive interior article or similar molded part where before porosity, cavities and/or pits resulted using just the normal large size pellets because of the details required in the cast part. Such different size pellets can be produced using different extruding dies for the different size pellets but this can be inefficient as indicated above. Moreover, the different size pellets must then be mixed together in the desired proportion before using.

The present invention avoids the need for different underwater pelletizer extruding dies for the different size pellets and also the need for an additional multisize pellet mixing step by incorporating these features all into one single extruding die to produce a mix of desired different size pellets in the desired proportions in a highly efficient manner. This is accomplished by the provision of a plurality of groups of extruding die holes in the face of the die opposite the cutter that are connected to a central main feed passage by separate distribution feed passages. The extruding die holes in each group are arranged in a circular pattern about a center line that is radially spaced from the center line of the cutter, and at least some of the extruding die holes in each group have an extruding hole size that is different from that of at least some of the extruding die holes in the other groups as explained in more detail below.

In one embodiment, the die holes in each group have a uniform size that is different from that of the die holes in at least one of the other groups, and the groups of die holes are connected to the main feed passage by separate distribution feed passages having different feed hole sizes that vary from a largest size for the group having the largest die holes to a smallest size for the group having the smallest die holes. Moreover, the die hole groups are arranged so that the different size pellets are evenly mixed or distributed as they are produced. In another embodiment, the die holes in each group are of at least two different sizes and are the same as those in at least one of the other groups, and the groups of die holes that are alike are connected to the main feed passage by separate distribution feed passages having a uniform feed hole size. Moreover, the different size die holes in each of the latter type groups are arranged so that the different size pellets are evenly mixed as they are produced.

In the distribution feed connections with the extruding die holes, the path from the main feed passage is minimized for least frictional resistance to the molten plastic flow by the compact surrounding circular clustering or grouping of the die holes and the use of short singular radial distribution feed passages that separately connect the main feed passage with the die hole groups via a manifold cavity in the die at each die hole group. Moreover, this arrangement by the sizing of the separate distribution feed passages provides for even distribution of the molten polymer to the die holes in each group at a rate they can accommodate without unduly backpressuring the plastic flow which could cause the die holes in the other groups to receive a disproportionate share of the plastic relative to their size.

The advantages of this multisize die hole arrangement thus include a wider and more efficient distribution with various size pellets, increased pellet volume outputs in various sizes, customized pellet size distribution, optimized processing by combining the advantages very small pellets and more efficient storage and shipping in that the smaller pellets fill in the spaces formed between the larger pellets when loaded into a container.

It is therefore an object of the present invention to provide a new and improved die system for an underwater pelletizer for simultaneously making different size pellets in desired proportions.

Another object is to provide an underwater pelletizer extrusion die having groups of extruding die holes for producing pellets in different sizes wherein the groups of die holes are connected in an efficient manner with a central main feed passage by separate distribution feed passages.

Another object is to provide an underwater pelletizer extruding die having circular groups of extruding die holes arranged about center lines spaced from a central main feed passage to which the groups of die holes are connected by separate radially extending distribution feed passages specially associated with the groups according to the size(s) of their die holes.

These and other objects, advantages and features of the present invention will become more apparent from the following description and accompanying drawings wherein:

DETAILED DESCRIPTION OF THE DRAWINGS

Figure 1:
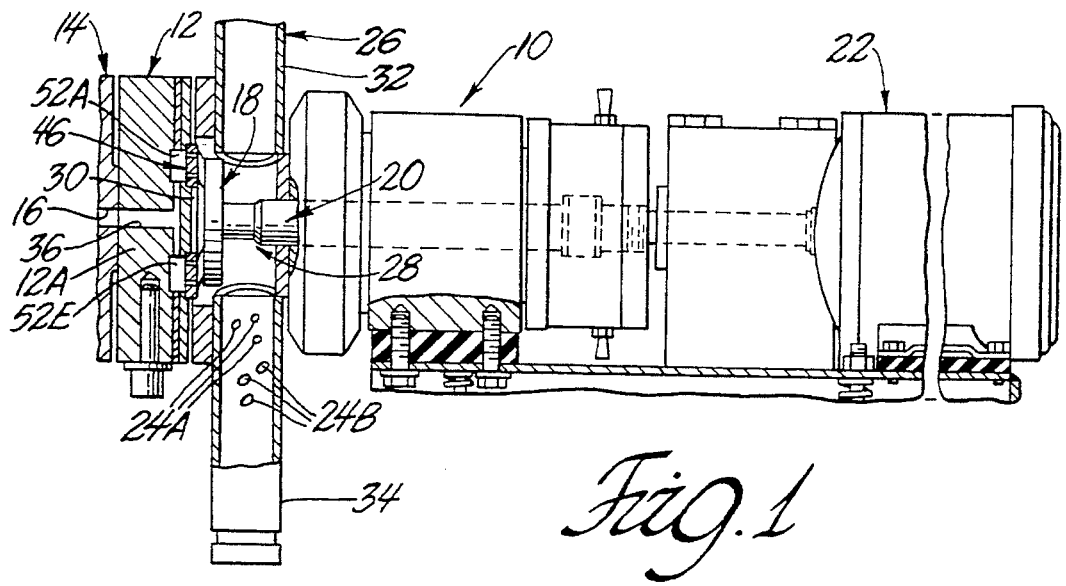
FIG. 1 is a side elevation view of an underwater thermoplastic pelletizer having an extruding die system incorporated therein according to the present invention and wherein the extruding die is shown in section and other parts of the pelletizer are broken away.

Referring to FIG. 1, there is illustrated an underwater thermoplastic pelletizer 10 which apart from an extruding die system including an extruding die 12 incorporated therein is of a conventional type like that disclosed in U.S. Pat. No. 4,728,276 which is hereby incorporated by reference. In addition to the extruding die 12 which will be described in detail later, the pelletizer die system basically comprises a transition device 14 that feeds molten thermoplastic polymer under pressure from a source (not shown) through a central passage 16 to the die, a multibladed cutter 18 that is driven through a shaft 20 by a motor 22 and severs the polymer extruded from a large number of at least two different size holes in the die into at least two different size pellets 24A and 24B (shown greatly exaggerated in size), and a water circulating system generally designated as 26 that includes a water box 28 enclosing the cutter 18 and the face 30 of the die. Cooled water is delivered to the water box 28 by a feed line fitting 32 where it acts to solidify the extruded polymer for cutting and wherein the pellets that are cut in such underwater environment are then conveyed along with the now warmed water from the water box by a return line fitting 34. The pellets are then collected from the return line in a conventional manner prior to the water being cooled again and recirculated through the water box.

Figures 2, 3:
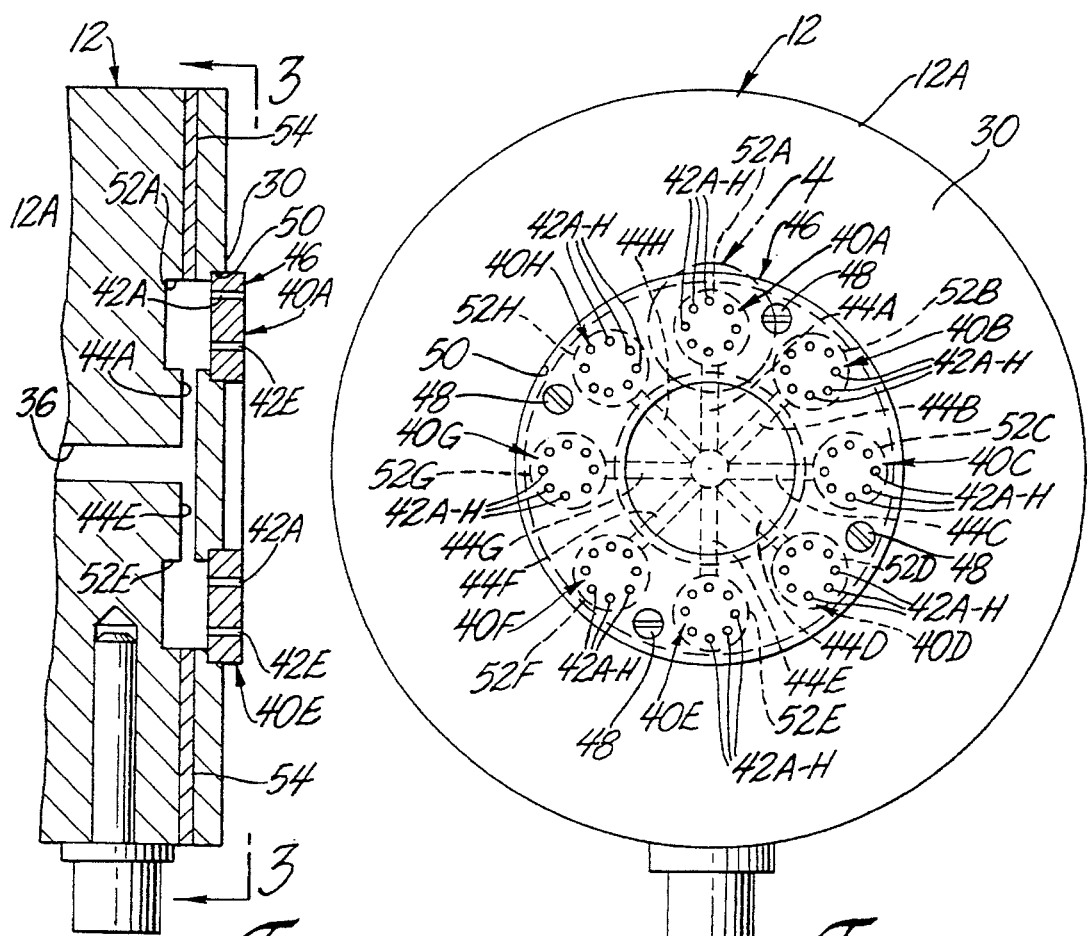
FIG. 2 is an enlarged view of the extruding die in FIG. 1.
FIG. 3 is a view taken along the line 3—3 in FIG. 2 when looking in the direction of the arrows.

Referring now to FIGS. 1–3, the extruding die 12 has a generally cylindrical shape and is clamped in place between the transition device 14 and water box 28 by suitable means (not shown) that secure these components together and to the main structure of the pelletizer. The die 12 has a central feed passage 36 that is open at one end to the central passage 16 in the transition device 14 to receive a molten thermoplastic polymer such as thermoplastic polyurethane (TPU). The other end of the central feed passage is closed to the die face 30 by being formed as a blind axial hole in the body 12A of the die. As seen in FIG. 3, a plurality of groups 40A–H (i.e. eight in number) of miniature extruding die holes 42A–H, respectively, (i.e. also eight in number and shown greatly exaggerated in size) are provided in the die face and with all the die holes in each group connected to the central feed passage 36 by separate singular radially extending distribution feed passages 44A–H (i.e. also eight in number) that are formed in the body of the die. In the description that follows of the extruding die 12, it will be understood that the number of die hole groups and the number of die holes in the groups has been illustrated as being only eight in number to simplify the drawings and that there may be many more holes in each group as well as more groups. For example, there may be sixty (60) die holes in each die hole group resulting in a total of 480 die holes where eight groups are retained.

The die hole groups 40A–H are formed separate from the body of the die in a cylindrical ring-shaped die plate 46 of uniform thickness that is made of high grade tool steel. The die plate 46 is fastened with counter sunk bolts 48 in a circular groove 50 of rectangular cross section in the body of the die at the die face 30 so as to be concentric with the cutter 18. The die plate 46 covers separate manifold defining cylindrical cavities 52A–H that are formed in the die body in the bottom of the groove 50 at equally angularly and radially spaced locations and the die plate on its outer side extends slightly beyond the die face 30 to be wiped by the blades of the cutter 18. And the separate feed passages 44A–H for the respective die hole groups 40A–H are formed by boring radially inward into the body of the die to intersect with the respective cylindrical cavities 42A–H at a central location and behind where the die plate is later mounted and to then ultimately intersect with the central feed passage 36 at a substantially perpendicular angle. The portion of these machined radial bores outward of the respective cylindrical cavities is then filled by a press fitted plug 54 (see FIG. 2) or by other suitable means such as a threaded plug leaving the cylindrical cavities 52A–H to provide a manifold connection, when the die plate is attached, between the respective feed passages 44A–H and all the die holes in the respective die hole groups 40A–H which are located in the die plate between its inner and outer diameter so as to be open to the respective cavities.

The miniature extruding die holes in the groups 40A–H are laser machined in the die plate at equally radially and angularly spaced locations in circular patterns about center lines that are equally radially and angularly spaced in a circle about the center line of the cutter 18 and so as to be in its cutting path. The die holes 42A–H in each of the groups are round holes and are formed with either a uniform size (diameter) as shown in FIG. 4 that is different from those in at least one of the other groups or they are formed with at least two subgroups of different size (different diameter) die holes as shown in FIG. 5 with the main die hole groups 40A–H all alike.

Figure 4:
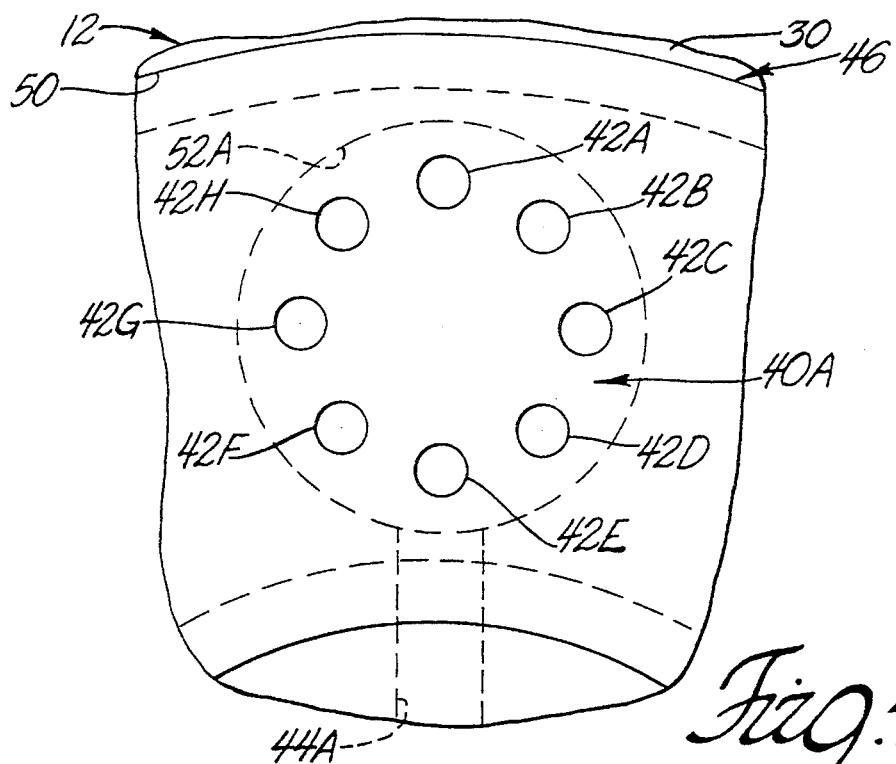
FIG. 4 is an enlarged view of one of the die hole groups in FIG. 3.

For example, in the FIG. 4 embodiment, the holes 42A–H in group 40A may all be 0.008 inch diameter holes, the holes 42A–H in group 40B may all be 0.020 inch diameter holes, and the holes 42A–H in the remaining groups 40C–H may have the same size as the group 40A or group 40B or have different uniform third, fourth, etc. size holes depending on the sizes and mix proportions of pellets desired. Furthermore, the groups of uniform size holes of one size are alternately arranged with the groups of holes with a different size for even mixing. For example, in the FIG. 4 embodiment, the die holes in groups 40A, C, E and G may be the same size (e.g. 0.005 inch diameter) and those in the remaining equal number of alternately arranged groups 40B, D, F and H are also of a uniform size (e.g. 0.020 inch diameter) that is different from the holes in the first-mentioned groups. This arrangement results in a proportionate mix of relatively small (0.005 inch diameter) pellets and large (0.020 inch diameter) minibeads. In another example, a larger number of groups of one size die hole is provided to produce a greater proportion of this size pellet in the mix which may include one or more different size minibeads in various numbers or proportions provided by the other die hole groups.

Figure 5:
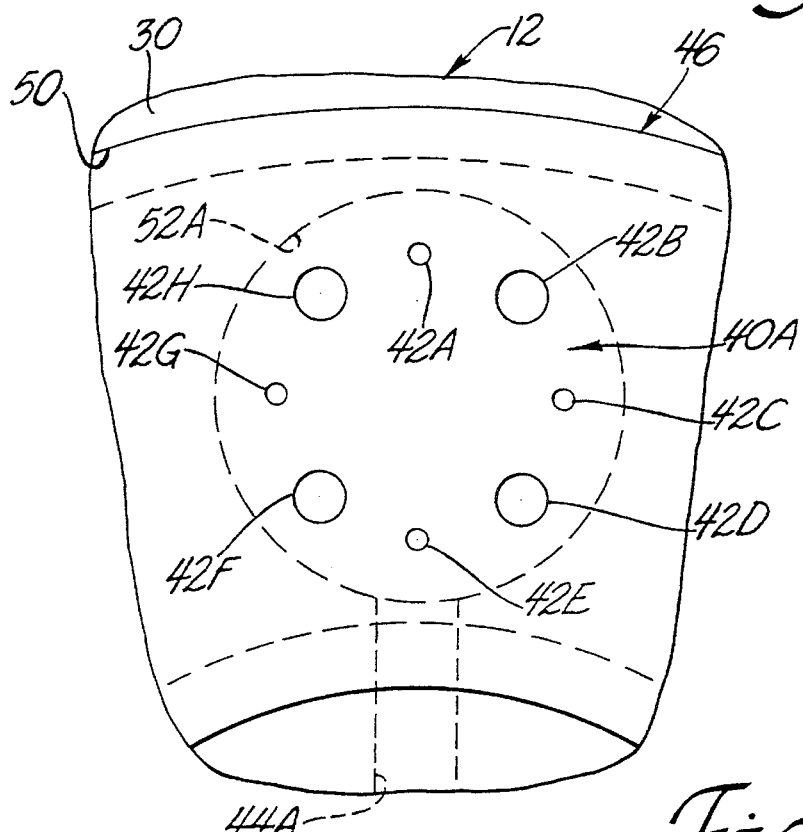
FIG. 5 is a view like FIG. 4 but of another embodiment of the die hole groups.

In the FIG. 5 embodiment wherein the die hole groups are all alike, the holes in each group are divided into two or more subgroups of different size die holes depending on the number of different size minibeads desired and in alternating series for even mixing. And the number of holes in the subgroups may be equal or different in number depending on the mix proportions of different size pellets desired. For example and as shown in FIG. 5, the holes 42A, C, E and G in all of the groups 40A–H may be one size (e.g.0.005 inch diameter) to form one subgroup and the remaining alternate holes 40B, D, F and H in the die hole groups may be a different size (e.g. 0.020 inch diameter) to form another subgroup which together with the other subgroup produces a proportionate mix of two different size minibeads. Or there may be more than two different sizes of holes in each group and in equal or different numbers depending on the number of sizes and mix proportions of pellets desired.

The rate of flow of the molten plastic through a passage is resisted by friction to a certain degree related to the length of the passage and to a much greater degree related to the diameter of passage as is well known in the art. This friction is minimized for efficient multisize pellet production in the underwater pelletizer extruding die 12 by the central location of the single feed passage 16, the close and uniform arrangement of the circular die hole groups 40A–H thereabout, the use of separate short distributing feed passages 44A–H extending perpendicularly from the central feed passage 16,36 to the die hole groups, and by making the size (diameter) of these short distribution feed passages in proportion to the accumulative size of the die holes that they feed. For example, those die hole groups in both FIG. 4 and FIG. 5 as described above and having a relatively small accumulative size of die holes are provided with a relatively small diameter distribution feed passage while those with a relatively large accumulative size of die holes are provided with a relatively large diameter distribution feed passage to provide substantially even distribution of the molten plastic between the die hole groups and thereby overall efficient extrusion at all the different size die holes.

The provision of the die hole groups in a detachable plate also provides additional advantages apart from their simple formation therein in that interchangeable die hole plates can be used having different die hole groups and different die hole sizes suited to meet various specific pellet size and mix requirements. Moreover, the detachable die plate provides for efficient cleaning thereof with its removal and also the manifold cavities therebehind as well as the internal passages in the die body.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. In an underwater thermoplastic polymer pelletizer die system having an extruding die, a cutter for cutting a thermoplastic polymer extruded from the die into pellets as the polymer is solidified from a melt to a solid under water, and a water system for circulating cooling water past the extruded polymer to solidify same for cutting and to convey away the pellets, the improvement comprising a main feed passage located centrally in said die adapted to receive a molten thermoplastic polymer, a plurality of groups of miniature extruding die holes in said die connected to said main feed passage, the die holes in each said group being arranged in a circular pattern about a center line that intersects with a circle having a center on the center line of the cutter, and at least some of the die holes in each said group having a hole size that is different from that of at least some of the die holes in the other groups; and wherein the size of the die holes in each said group is a uniform size and is different from that of the die holes in at least one of the other groups, and said groups of die holes connected to said main feed passage by separate distribution feed passages having a hole size that varies from a largest size for the group having the largest size die holes to a smallest size for the group having the smallest size die holes.

2. In an underwater thermoplastic polymer pelletizer die system having an extruding die, a cutter for cutting a thermoplastic polymer extruded from the die into pellets as the polymer is solidified from a melt to a solid under water, and a water system for circulating cooling water past the extruded polymer to solidify same for cutting and to convey away the pellets, the improvement comprising a main feed passage located centrally in said die adapted to receive a molten thermoplastic polymer, a plurality of groups of miniature extruding die holes in said die connected to said main feed passage, the die holes in each said group being arranged in a circular pattern about a center line that intersects with a circle having a center on the center line of the cutter, and at least some of the die holes in each said group having a hole size that is different from that of at least some of the die holes in the other groups; and said groups of die holes being connected to said main feed passage by separate distribution feed passages that are substantially perpendicular to said main feed passage.

3. An underwater thermoplastic polymer pelletizer die system as set forth in claim 2 wherein the die holes in each said group includes at least two subgroups of different size die holes, the other of said groups also having the same said subgroups, and said groups of extruding die holes are connected to said main feed passage by separate distribution feed passages having a uniform feed hole size.

4. An underwater thermoplastic polymer pelletizer die system as set forth in claim 1 wherein said groups of extruding die holes are provided in a plate of uniform thickness, and fasteners fastening said plate to a body portion of said die in a detachable manner.

5. In an underwater thermoplastic polymer pelletizer die system having an extruding die, a cutter for cutting a thermoplastic polymer extruded from the die into pellets as the polymer is solidified from a melt to a solid under water, and a water system for circulating cooling water past the extruded polymer to solidify same for cutting and to convey away the pellets, the improvement comprising a main feed passage located centrally in said die adapted to receive a molten thermoplastic polymer, a plurality of groups of miniature extruding die holes in said die connected to said main feed passage, the die holes in each said group being arranged in a circular pattern about a center line that intersects with a circle having a center on the center line of the cutter, and at least some of the die holes in each said group having a hole size that is different from that of at least some of the die holes in the other groups; and wherein said groups of extruding die holes are in a plate of uniform thickness attached to said die, and separate cavities in said die located behind said plate and the respective groups of extruding die holes connects the respective groups of die holes with the respective distribution feed passages.

6. An underwater thermoplastic polymer pelletizer die system as set forth in claim 5 wherein said die holes have a diameter in a range of about 0.005 to 0.020 inches.

7. An underwater thermoplastic polymer pelletizer die system as set forth in claim 2 wherein said groups of extruding die holes are in a plate of uniform thickness attached to said die, and separate cavities in said die located behind said plate and the respective groups of extruding die holes connects the respective groups of die holes with the respective distribution feed passages.

8. An underwater thermoplastic polymer pelletizer die system as set forth in claims 2 wherein the size of the die holes in each said group is a uniform size and is different from that of the die holes in at least one of the other groups, and said groups of die holes connected to said main feed passage by separate distribution feed passages having a hole size that varies from a largest size for the group having the largest size die holes to a smallest size for the group having the smallest size die holes.

* * * * *